United States Patent

[11] 3,568,583

| [72] | Inventors | Charles Horberg, Jr.<br>2980 Lake Placid Lane, Northbrook, 60062;<br>Jere J. Willing; Abe Shulman, 2139 W. Farewell Ave., Chicago, Ill. 60645 |
|---|---|---|
| [21] | Appl. No. | 728,405 |
| [22] | Filed | May 13, 1968 |
| [45] | Patented | Mar. 9, 1971 |

[54] SURVEILLANCE CAMERA DEVICE AND CONTROLS THEREFOR
14 Claims, 5 Drawing Figs.

| [52] | U.S. Cl. | 95/15 |
|---|---|---|
| [51] | Int. Cl. | G03b 37/02 |
| [50] | Field of Search | 95/11, 15 |

[56] References Cited
UNITED STATES PATENTS

| 3,285,151 | 11/1966 | Black | 95/15 |
|---|---|---|---|
| 3,434,405 | 3/1969 | Friedman | 95/11 |
| 3,437,753 | 4/1969 | Stith | 95/15X |

*Primary Examiner*—John M. Horan
*Attorney*—Alter, Weiss and Whitesel

ABSTRACT: Antitheft surveillance camera arrangement for reciprocatingly scanning a given area. The camera is able to automatically expose film therein. The antitheft surveillance camera arrangement includes a motorized scanning mechanism mounted on the outside of the camera case. The motor continuously operates in one direction. The outside mounting enables the motor mechanism to be more readily accessible for servicing and reduces the inertia of the reciprocating camera case.

Patented March 9, 1971

INVENTORS
CHARLES HORBERG JR.
JERE J. WILLING
BY ABE SHULMAN

*Alter and Weiss*
ATTORNEYS

Patented March 9, 1971

INVENTORS
CHARLES HORBERG JR.
JERE J. WILLING
BY ABE SHULMAN

*Alter and Weiss*
ATTORNEYS

INVENTORS
CHARLES HORBERG JR
JERE J. WILLING
BY ABE SHULMAN

*Alter and Weiss*
ATTORNEYS

SURVEILLANCE CAMERA DEVICE AND CONTROLS THEREFOR

This invention relates to security cameras, and more particularly, to surveillance camera devices which reciprocatingly scan and intermittently expose film and the controls therefor.

Self service stores, such as supermarkets, or discount trade centers wherein the customer helps himself and there is a minimum number of clerks to aid the customer have, since their inception, been plagued with pilferage and theft problems. The losses sustained by such pilferage stimulated a new antitheft industry. Among the original antitheft equipment were curved mirrors which enabled the small force of clerks to maintain personal surveillance on most of the stock in a store. The difficulty with this antitheft device is that the thief can readily see when he is being watched in the mirror merely by looking at the clerk in the mirror to observe whether or not he is under observation.

A more sophisticated means for deterring the petty pilferer were dummy cameras which tend to deter the potential thiefs by their very presence. Thus, it was found that the amount of dollars volume lost through pilferage drops remarkably when dummy cameras are located within the stores. It was soon discovered that when the cameras simulated live cameras by, for example, moving in a reciprocating fashion to scan sections of the store and having lights thereon, the losses caused by pilferage diminished even further.

As the antitheft field developed, it expanded from the supermarkets and discount stores into banks, lending institution and other places that were vulnerable to losses through planned burglary rather than pilferage. In such places, actual cameras are used. In fact, many banks now have television cameras in various parts of the bank that are all coupled to centrally located monitors.

Throughout the development of the infant antitheft industry, troubles were encountered with the reciprocating mechanism used to cause the camera to scan. Among the first mechanisms used, were camera mounts utilizing reversing motors and microswitch controls. The microswitch controls proved difficult to adjust and relatively unreliable. In addition, the film supply needs constant replenishing unless the camera is operated intermittently. Also, it is not always readily determinable when the camera has exposed all of the film therein.

Accordingly, an object of this invention is to provide improved security cameras having reliable scanning mechanisms and equipped with programming systems for exposure of the film.

A related object of this invention is to provide a reciprocating scanning camera mount that can be used for a large variety of different size and different type cameras.

A further object of this invention is to provide reciprocatingly moving camera mounts wherein no microswitch controls are used for changing the direction of the scan. Rather the entire reciprocating operation is mechanically controlled.

A further related object of this invention is to provide a reciprocatingly driven camera mount utilizing a minimum of gears to control the reciprocating motion of the mount.

A preferred embodiment of this invention comprises a reciprocating mechanism wherein the radius of the scan can be readily changed. The motor driven mechanism drives a heart shaped cam which alternately exerts a force on two opposed bearings. When the force is exerted on the first bearing, the camera is forced in one direction on an arcuate path; when the force is exerted on a second bearing, the camera is forced in the opposite direction on the arcuate path. Means are also provided for intermittently programming the camera shutter so that an on/off period is provided for exposure of the film in the camera. The on/off control is also equipped with means for indicating when the film has all been exposed.

The above-mentioned and other features and objects of this invention and the manner of the obtaining of them will become more apparent, and the invention itself will be best understood by reference to the following description of an embodiment of the invention taken in conjunction with the accompanying drawings, wherein.

Figure 1:
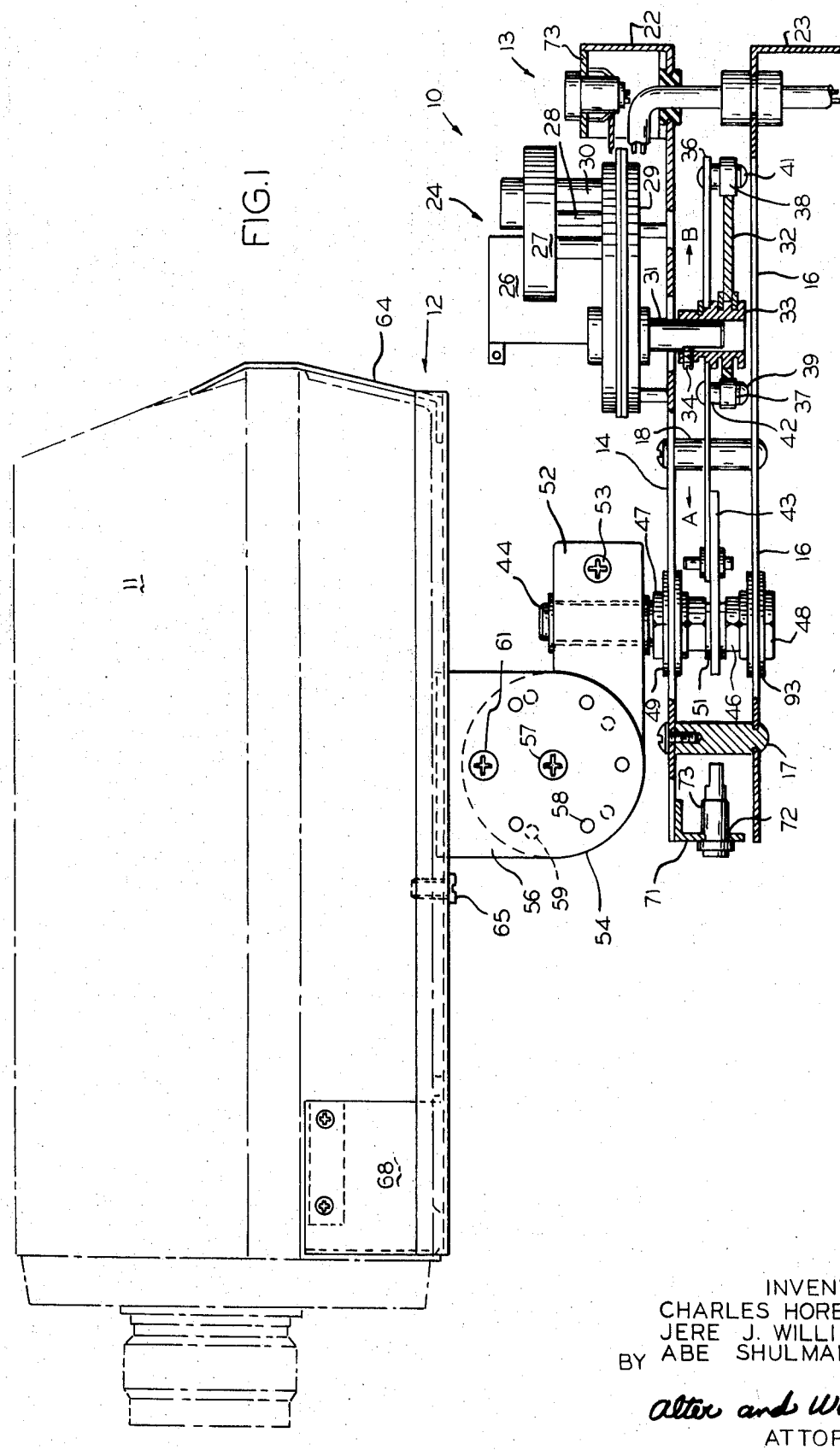
FIG. 1 shows a semisectional form a side view of the inventive scanning device.

Referring now to the drawings, therein the camera case and reciprocating mechanism arrangement are shown assembled as unit 10. The camera case 11 is shown in dashed lines. Different sizes and varieties of cameras can be accommodated by case 11. The camera is mounted on bracketing arrangement 12. The mechanism 13 is shown in semisectional form to more completely disclose the invention. It is mechanism unit 13 that drives the case 11 in its reciprocating arcuate scanning motion.

The mechanism unit 13 comprises a top plate 14 and a bottom plate 16. The top and bottom plates are maintained unifiedly spaced apart by support posts such as support post 17 and 18.

Means are provided for mounting the mechanism unit 13 to a wall, for example. More specifically, plates 14 and 16 have L-shaped sections 22, 23 respectively at one end thereof. For example, sections 22 and 23 are normal to the base portions of plates 14 and 16 respectively, and have apertures therein for receiving fasteners therethrough for mounting the mechanism unit 13 to a wall, for example.

Means, such as synchronous motor 24 are provided for actuating the mechanism to provide the reciprocating scanning motion required. Motor 24 comprises a coil section 26 and an armature-stator section 27. Shaft 28 of motor 24 is coupled to gear box 29. The gears in gear box 29 are such that the output shaft 31 of gear box 29 moves slower than the motor shaft 28 driving the gears in the gear box. The motor 24 is supported on the gear box 29 by spacers, such as spacer 30.

Means are provided for coupling the drive shaft, 31 to a heart-shaped cam 32. More particularly, hub 33 is locked to shaft 31 by means of set screw 34 which passes through an aperture at the top of cam hub 33 to abut a flat on cam drive shaft 31. The rotation drive shaft 31 causes cam 32 to rotate which in turn drives reciprocating arm 36 linearly forward and backward. Thus, the rotary motion of shaft 31 is translated to a reciprocating linear motion. This is accomplished by means of twin cam bearing follower rollers 37, 38. At all times the bearing cam follower rollers are contiguous to the outer periphery of the heart-shaped cam and are fixedly attached to reciprocating arm 36. Thus, when the heart-shaped cam rotates so that its lower portion abuts and is contiguous with cam bearing roller 37, it forces reciprocating arm 36 in the direction of arrow A. When the heart-shaped cam 32 rotates so that its lower portion abuts and is contiguous to the cam follower bearing roller 38, it forces reciprocating arm 36 in the direction of arrow B. Cam follower roller bearings 37 and 38 are fixedly attached to the reciprocating arm 36 by means such as truss head rivets 39 and 41, respectively. Bearing races, such as race 42, are provided around each of the rivets to enable the followers to roll with a minimum of friction in following the heart-shaped cam 32.

Means are provided for translating the linear reciprocating motion of reciprocating arm 36 to an arcuate reciprocating motion. More particularly, arm lever 43 is shown coupled to output shaft 44 through hub 46. Shaft 44 is press-fitted into hub 46 and rotates freely in bearing blocks 47, 48 which are mounted into plates 14 and 16, respectively, using means such as snap rings 49.

Lever arm 43 is fixedly attached to hub 46 using any well known means, such as snap ring 51. Thus, when the cam drive shaft 31 rotates, cam 32 rotates pressing against roller 37, for example, forcing reciprocating arm 36 in the direction of arrow A. When arm 36 moves in the direction of arrow A, arm 43 attached thereto is arcuately moved to turn hub 46 and consequently shaft 44 in a clockwise direction. As cam 36 continues to rotate, it subsequently forces reciprocating arm 36 in the direction of arrow B which in turn rotates shaft 44 in a counterclockwise direction.

Means are provided for coupling camera case bracket 12 to drive shaft 44. More particularly, clamp 52 fits tightly around shaft 44 so that the clamp 52 rotates when shaft 44 rotates. Clamp 52 is tightened by means such as fastener 53.

Detent means are provided for setting the angle of inclination of the camera as desired. More particularly, circular indexing detent 54 is integral to clamp 52. Detent bracket 56 is disposed from bracket arrangement 12 extending downwardly and ending in an arcuate section which fits over the circular detent bracket 54 portion of clamp 52. The detent bracket 56 rotates around axis 57. The axis 57 comprises a phillips head screw, for example. The arcuate end of detent bracket 56 has a plurality of apertures, such as hole 58 located at a fixed radius from the axis 57. Indexing detent 54 also has a plurality of apertures, such as hole 59, located at the same fixed radius from axis 57. The apertures in the indexing detent 54 are angularly displaced from the apertures in the detent bracket 56, such that only one pair of holes can be coaxially aligned at any time. A screw, for example, or a pin, such as screw 61, is placed through the apertures coaxially aligned on detent bracket 56 and detent 54 to obtain the inclination of the camera desired.

Figure 3:
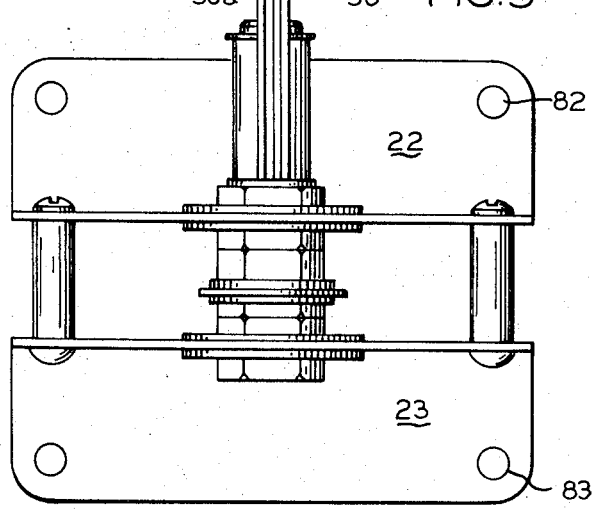
FIG. 3 is a front view of the reciprocating surveillance camera device showing a camera case mounted thereon in dashed line form.

As best seen in FIG. 3, detent bracket 56 can comprise a double bracket for added strength. Thus, FIG. 3 shows detent bracket 56 and 56a on opposite sides of detent plate 54.

The top of detent bracket 56, 56a comprises L-shaped sections 57, 57a, respectively. These sections are juxtaposed to bottom bracket 60 of bracket arrangement 12. The bottom bracket is designed to hold the camera cases thereon, or it may comprise an integral part of the camera case. The L-shaped portions 63a, 63b can be attached to bottom bracket 60 in any well known manner either by welding or through the use of fasteners.

As best seen in FIG. 1, bottom bracket 60 extends sufficiently to reach from the rear of the camera to almost the front thereof. At the exact rear there is a back plate 64 designed to retain the camera case. A front bridge 66 in FIG. 3 is attached through side brackets 67 and 68 to bottom plates 58. The front bridge is used for adapting the camera case to many different types of cameras (not shown). When a closed circuit television camera is used in the case 11, bridge 66 is removed and the television camera is held in case 11 to frame 12 by means, such as screw 65.

A light bracket 71 may be coupled to top plate 14 at the front thereof. The light may also be mounted in the camera case. The light bracket may be attached to the top bracket in any well known manner. The light bracket 71 has an aperture therein, 72, designed to receive light assembly 73. This light can be used for indicating such things as operativeness of the unit or the end of film. Thus, when the light is lit, it is a signal to replenish the film supply. This light, of course, may be located remote from the camera case and mechanism.

Bracket 73 at the rear end of the mechanism juxtaposed to section 22 is utilized to carry controls, such as switch 74 and plug 76. Other plugs and/or switches may be mounted on this bracket. The bracket 73 is mounted to shoulders 77 and 78 using fasteners such as fastener 79 which passes through one of the posts which maintains the bottom and top plates spaced apart. The electrical cord running from the light to its power source is shown as cord 81, and may be attached as shown in FIG. 2.

As is best shown in FIG. 3, the brackets or the end portions 22, 23 of plates 14 and 16 have apertures therethrough such as aperture 82 and 83 for receiving fasteners to connect the mechanism to a wall or post through the use of well-known fasteners.

Figure 2:
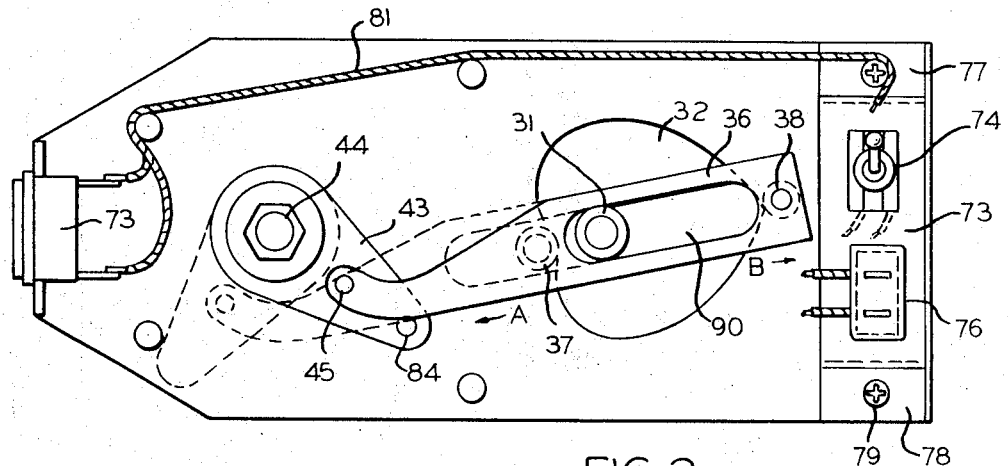
FIG. 2 is a top view of the reciprocating scanning camera device.

FIG. 2 best illustrates the operation of the reciprocating mechanism. The heart-shaped cam 32 is shown in the position wherein it is about to change its force translation motion from follower 38 to follower 37. For example, if the cam is rotating in a clockwise direction, the forces have been exerted against bearing 38, moving arm 36 in the direction of arrow B, as cam 32 continues to rotate in a clockwise direction, forces will now be exerted on bearing 37 causing reciprocating arm 36 to move in a direction of arrow A, to the position indicated by the dotted lines X. Reciprocating arm 36 is shown attached to lever arm 43 with removable pin 45. Removable pin 45 could, of course, be attached or placed into any of the plurality of apertures, such as aperture 84 in arm 43. The point where the pin is connected to arm 43 controls the length of the arc through which the camera will be rotated. Thus, the inventive device provides means to adroitly vary the length of the scanning arc.

Figure 4:
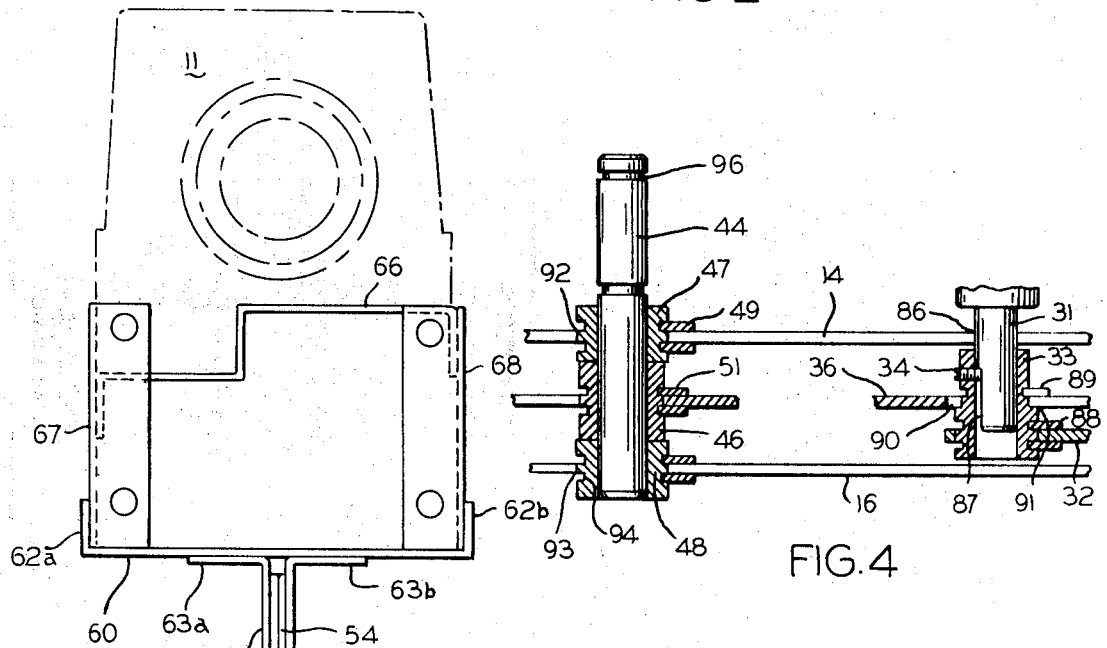
FIG. 4 shows in partial sectional view form the relationship between the motor shaft and the camera drive shaft.

As best seen in FIG. 4, the cam drive shaft passes through an aperture 86 in top plate 14. The shaft has a flat section 87 designed to receive the ends of set screw 34 and to thereby fixedly attach cam hub 33 to drive shaft 31. The heart-shaped cam 32 is fixedly attached to hub 33 using well known C-clamps, such as C-clamp 88. Similarly, the reciprocating arm 36 has a groove 90 therein. Groove 90 passes around shaft hub 33 to enable arm 36 to move in reciprocating motion about the shaft. A C-clamp 89 retains arm 36 contiguous to shoulder 91 so that the arm does not climb the hub, but rather is retained in a horizontal position parallel to the plates 14, 16.

Similarly, apertures 92 and 93 in plates 14 and 16 respectively receive drive shaft hub, such as drive shaft bearings 46 and 47 respectively. Grooves are located in shaft 44 to receive retaining rings therein, such as retaining ring 93 shown in FIG. 1. It is received in groove 94. The retaining rings received into the grooves assure that the position of the clamp 52 is maintained horizontal and parallel to the plates. This assures that the angle of inclination of the camera is controlled by indexing detents 54 rather than by placing the camera case askew upon the shaft 44.

Figure 5:
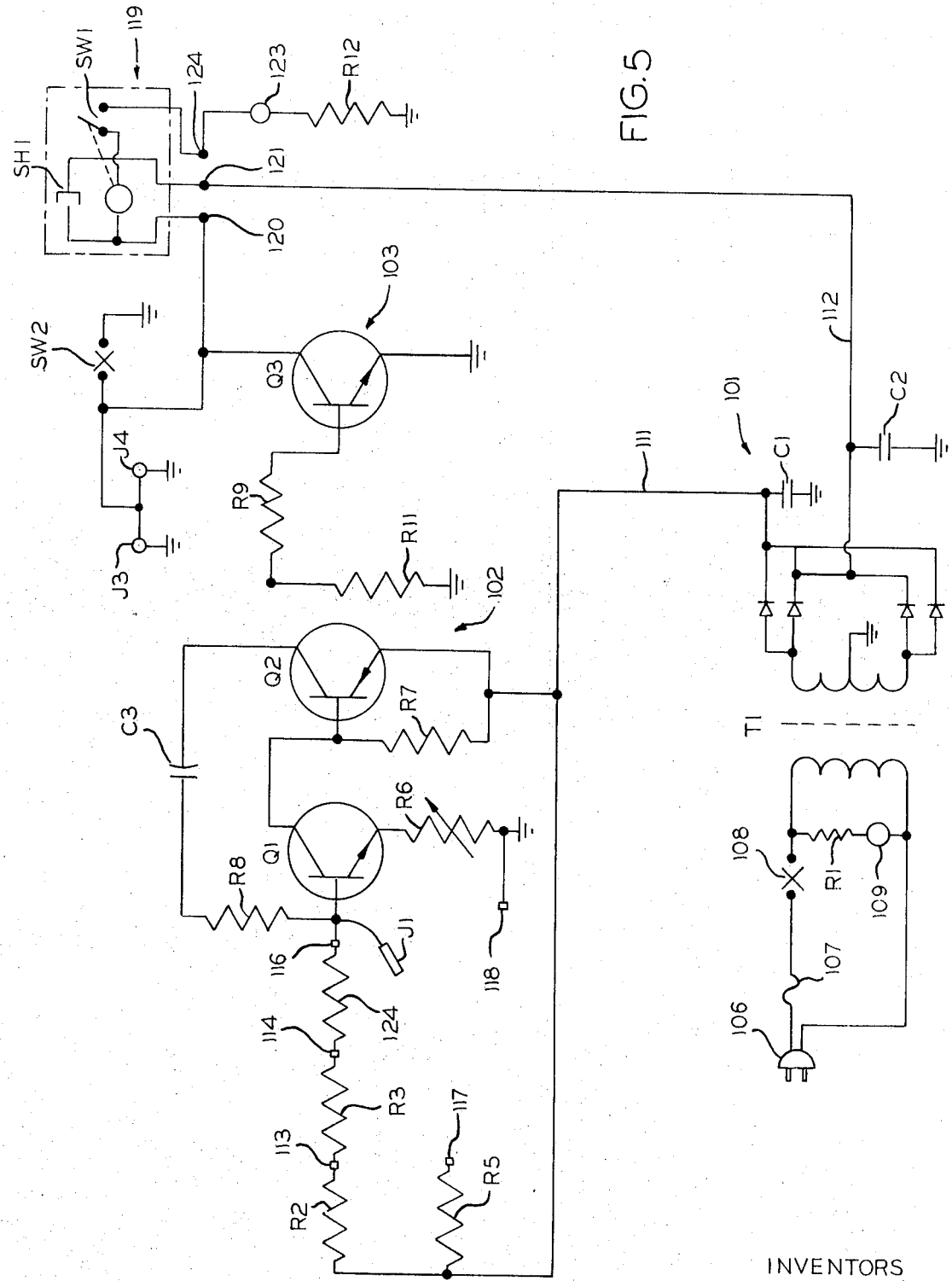
FIG. 5 is a schematic of the electronic circuitry used in controlling the camera shutter and the end of film indication.

Means are provided for intermittently operating the shutter of the camera to expose a few as a single frame at a time and thus, maximize the time between camera loadings. More particularly, as schematically shown in FIG. 5, a control circuit is provided. The control circuit can be divided into a power supply shown generally as 101. A timing control circuit shown generally as 102 and a switching amplifier shown generally as 103.

The power supply 101 is shown as a full wave rectifier. A plug, such as plug 106, is adapted to fit into socket 76. Fuse means 107 are provided in the power line to safeguard the circuitry. An on/off switch, shown as 108, is provided so that the camera can be rotated and the "mock" scanning can be accomplished without the operation of the shutter or exposure of any of the film. A neon light 109 may be provided to indicate whether or not the on/off switch is operated. When the switch is on, power is directed through the neon light, and resistor R1 causing light 109 to operate. Power transformer T1 then receives power in its primary which induces power in the secondary of transformer T1 where it is rectified by diodes indicated as D1, D2, D3 and D4 in the full wave rectifier configuration. Actually, dual outputs are provided on lines, such as lines 111 and 112 both of which provide equal B plus voltage. Line 111 transmits B plus through a serial chain of resistors R2, R3 and R4 connected to the base of a first transistor Q1.

Between each of these resistors is a jack point, or plug, such as plugs 113, 114 and 116. Lead 111 also leads to one side of resistors R5 and through resistor R5 to jack point 117. Transistor Q1 is a NPN type transistor whose emitter is connected through a variable resistor R6 to ground. A continuous run jack point or plug 118 is located at the point wherein resistor R6 is connected to ground.

The collector of transistor Q1 is directly coupled to the base of PNP transistor Q2. The base of transistor Q2 is also connected to a B plus through biasing resistor R7. The emitter of the transistor Q2 is connected directly to B plus. The collector of transistor Q2 is connected to a feedback circuit comprising serially connected capacitor C3 and resistor R8.

The transistors Q1 and Q2 conduct until the capacitor C3 charges up sufficiently to bias Q1 to the nonconducted state. The other side of resistor R8 is connected to timing selector jack J1. The jack J1 is coupled to the jack point that will provide the desired time between film exposures by controlling the discharge time of capacitor C3.

The collector of transistor Q2 is connected through coupling resistor R9 to the base of an NPN transistor Q3. Biasing resistor R11 is coupled between the collector of transistor Q2 to ground.

The emitter of transistor Q3 is coupled directly to ground while the collector which provides the timed output is connected to one side of a three terminal connector 119. The connector leads to actual apparatus in the controlled camera. For example, a shutter control SH1 and motor M1 are connected through the film drive terminal 120 of connector 119 to the collector of transistor Q3. The other side of the shutter control and the motor are connected through the intermediate terminal 121 of the connector to B plus on lead 112; thus the shutter and motor operate circuits are completed when transistor Q3 conducts.

The third and outside terminal of the connector 112 is coupled to one side of switch SW1 in the camera. The switch may be operated by a cam coupled to the film drive motor M1 located so that when the drive motor has rotated sufficiently to cause all of the film in the camera to be utilized, switch SW1 will be operated to connect B plus through the connector to the film end light 123. A resistor R12 is connected between the outer side of the light and ground to control the current flow through the light.

An emergency switch SW2 is in the circuit and provides a means on the camera arrangement for manually operating the camera without using the control and timing circuitry of FIG. 5. Also, jacks such as jack J3 and J4, are provided. These jacks can be connected, if desired, to remotely located switches for operating the film motor from a remote location, if this is desired.

Thus, in operation the camera scanning drive arrangement is attached to a wall or a post. The scanning mechanism when switched on, causes the camera to oscillate in the described reciprocating arcuate motion. As the camera rotates on this arc, the shutter can be operated under the control of the circuitry of FIG. 5 to be opened, for example, for one-sixth of a second, and off for 10 seconds. Thus, it randomly takes shots and the roll of film in the camera will last for a reasonable amount of time. When the film is used up, the film end light is turned on to so indicate.

Other switches can be remotely located so that if any suspicious looking people are in the store, then the camera can be operated to take pictures. At all other times the camera can be left in its inoperative condition; however, it will be going through the scanning motion at all times. This tends to deter any would be pilferers who have no way of knowing whether or not the camera is operating to take pictures.

The control circuitry can be mounted in the camera case on the scanning mechanism. Ideally, it is remotely located.

While the principles of this invention have been described in connection with specific apparatus and applications, it is to be understood that this description is made only by way of example, and not as a limitation on the scope of the invention.

We claim:

1. A surveillance camera device which reciprocatingly scans and enables the automatic exposure of film or other type of surveillance, said reciprocatingly scanning device comprising:
   camera case means for mounting cameras therein to selectively take photographs during said scanning;
   a scanning mechanism located outside of said case for reciprocatingly moving said camera case through an adjustable arc;
   said mechanism including:
   means for adjusting said arc;
   output shaft means for mounting said case to said mechanism;
   lever arm means affixed to said output shaft means for causing said shaft to oscillate through the arc;
   linear reciprocating means for actuating said lever to move said shaft;
   motor means mounted on said mechanism;
   drive shaft means operated by said motor means to rotate in only one direction;
   cam means rotated by said drive shaft; and
   cam bearing means actuated by said cam means and coupled to said linear reciprocating means to translate said rotating motion to linear reciprocating motion whereby said case is caused to reciprocate through said arc.

2. The surveillance device of claim 1 wherein said cam means comprises a heart-shaped cam; and
   wherein said cam bearing means are located at opposite sides of said heart-shaped cam.

3. The surveillance device of claim 2 wherein said means for adjusting said arc comprises a series of apertures along the length of said lever arm means; and
   pin means for selectively attaching said linear reciprocating means to said lever arm means at a desired one of said apertures.

4. The surveillance device of claim 3 including means for selectively adjusting the angle of inclination of said camera case.

5. A surveillance camera device which reciprocatingly scans and enables the automatic exposure of film or other type of surveillance, said reciprocatingly scanning device comprising:
   camera case means for mounting cameras therein to selectively take photographs during said scanning;
   a scanning mechanism for reciprocatingly moving the camera case through an adjustable arc;
   means for adjusting said arc, output shaft means for mounting the case to said mechanism;
   lever arm means affixed to said output shaft means for causing said shaft to oscillate through the arc;
   linear reciprocating means for actuating said lever to move said shaft;
   said means for adjusting said arc comprising a series of apertures along the length of said lever means;
   pin means for selectively attaching said linear reciprocating means to said lever arm means at a desired one of said apertures;
   motor means mounted on said mechanism, drive shaft means operated by said motor means to rotate;
   cam means rotated by shaft;
   cam bearing means actuated by said cam means and coupled to said linear reciprocating means to translate said rotating motion to linear reciprocating motion whereby said case is caused to reciprocate through said arc;
   means for selectively adjusting the angle of inclination of the camera case included in said output shaft means;
   said output shaft means comprising an output shaft, clamp means clamped to said output shaft, index detent means integrally attached to said clamp means;
   said index detent means including axis member hole means and a plurality of holes in said bracket means spaced from said central hole at said certain radius;
   said holes in said bracket means being angularly spaced so that when said central hole and said axis member hole means are coaxial only one set of said plurality of radially spaced holes at a time in said bracket means and said detent means are coaxial;
   axis member means for insertion through said axis member hole means and said central hole; and
   pin means for insertion in said coaxially aligned set of holes to select the desired angle of inclination.

6. The surveillance device of claim 5, wherein control means are provided for automatically controlling the exposure of film in the camera case whereby the shutter is operated for a first period and remains inoperative for a second period of time during the reciprocating scanning cycle.

7. The surveillance camera means of claim 5 wherein said cam means comprises a heart-shaped cam, and wherein said cam bearing means are located on opposite sides of said heart-shaped cam.

8. A surveillance camera device which reciprocatingly scans and enables the automatic exposure of film or other type of surveillance, said reciprocatingly scanning device comprising:
camera case means for mounting cameras therein to selectively take photographs during said scanning;
a scanning mechanism for reciprocatingly moving said camera case through an adjustable arc;
means for adjusting said arc;
output shaft means for mounting said case to said mechanism;

9. The surveillance device of claim 8 wherein said timing circuitry comprises:
a first transistor and a second transistor;
means including a series of resistors for coupling the base of said first transistor to power supply voltage;
variable resistor means for coupling the emitter of said first transistor to ground;
means for directly coupling the collector of said first transistor to the base of said second transistor;
bias resistor means for coupling the base of said second transistor to the power supply voltage;
means for coupling the emitter of said second transistor to the power supply voltage;
means for coupling the collector of said second transistor to said switching means; and
feedback means for connecting the collector of said second transistor to the base of said first transistor, said feedback means comprising a feedback resistor and a feedback capacitor connected in series, said first and second transistors connected to conduct responsive to the operation of the on/off switch to the on position and to switch to the nonconductive state when said feedback capacitor is charged.

10. The surveillance device of claim 9 wherein said switching means comprises a third transistor, and wherein said means for coupling collector of said second transistor comprises a resistor coupled to the base of said third transistor.

11. The surveillance device of claim 10 wherein said means for varying said first period comprises jack and plug means for connecting said feedback circuit between different ones of said series of resistors or directly to the base of said first transistor whereby the feedback capacitor is discharged in different time periods to enable said transistors to conduct.

12. The surveillance device of claim 11, and bypass switch means for grounding the switch means side of said film motor and shutter control.

13. The surveillance device of claim 12 wherein means are provided for remotely grounding the switch means side of said film motor and shutter control.

14. The surveillance device of claim 13 wherein said film end indicating means comprises a light source, and film end switch means operated responsive to the end of the film for energizing said light source.